United States Patent
Carr

(10) Patent No.: US 9,822,869 B1
(45) Date of Patent: Nov. 21, 2017

(54) SPEED REGULATED SHAFT OIL FLOW CONTROLLER

(71) Applicant: Schaeffler Technologies AG & Co. KG, Herzogenaurach, DE (US)

(72) Inventor: Stephen Carr, Waterford, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/246,890

(22) Filed: Aug. 25, 2016

(51) Int. Cl.
*F16H 57/04* (2010.01)
*F16H 48/08* (2006.01)

(52) U.S. Cl.
CPC ......... *F16H 57/0421* (2013.01); *F16H 48/08* (2013.01); *F16H 57/0471* (2013.01); *F16H 57/0483* (2013.01); *F16H 2048/087* (2013.01)

(58) Field of Classification Search
None
See application file for complete search history.

(56) References Cited

U.S. PATENT DOCUMENTS

| | | | |
|---|---|---|---|
| 4,656,885 A * | 4/1987 | Hori | F16C 19/548 184/6.12 |
| 8,523,733 B1 | 9/2013 | Lippert | |
| 2004/0173042 A1* | 9/2004 | Jacob | F16C 19/182 74/424 |
| 2005/0213861 A1 | 9/2005 | Ono et al. | |
| 2015/0057125 A1* | 2/2015 | Pump | F16H 48/08 475/160 |

* cited by examiner

*Primary Examiner* — Edwin A Young
(74) *Attorney, Agent, or Firm* — Volpe and Koenig, P.C.

(57) ABSTRACT

A shaft oil flow controller arrangement for pinion shaft bearings in a differential is provided, including a housing along with a pinion shaft supported therein by head and tail bearings. A ring gear is mounted for rotation and is engaged with a pinion gear. A bearing spacer is located on the pinion shaft between the head and tail bearings. A diverter is located on the bearing spacer, and includes a circumferentially extending diverter wall that is moveable from a first position in which the wall extends generally in a longitudinal direction of the pinion shaft at a first, lower rotational speed of the pinion shaft allowing a first volume of lubricant oil flow to the head bearing, to a second position, in which the wall extends radially outwardly at a second, higher rotational speed, to restrict lubricant oil flow to the head bearing to a lower volume, and increase oil flow to the tail bearing.

18 Claims, 4 Drawing Sheets

SPEED REGULATED SHAFT OIL FLOW CONTROLLER

FIELD OF INVENTION

The present invention relates to lubrication control for rolling element support bearings for drive-line components in a motor vehicle, and in particular to a shaft oil flow controller that can be used for the pinion shaft in a differential.

BACKGROUND

Referring to FIG. 1, a prior art differential is shown in connection with an oil flow indicated as "OIL" that is intended to ensure adequate lubrication of the bearings 103, 104 located in the housing 101 that support the pinion shaft 102 that has a pinion gear 102a at one end that meshes with a ring gear 105 in a known manner. The pinion head bearing is a single-row tapered roller bearing 103 with tapered rollers 113 held in a cage 114, and the pinion tail bearing is a single-row angular ball bearing 104 with balls 123 held in a cage 124. The pinion head bearing 103 and the pinion tail bearing 104 are back-to-back assembled in the housing 101, and a pre-load is applied to the pinion head bearing 103 via the pinion tail bearing 104 and a spacer 107 located therebetween. The pre-load is adjusted by tightening or loosening a nut 108 so that the rear surface of an outer race 111 of the pinion head bearing 103 and the rear surface of a counter-bored outer race 121 of the pinion tail bearing 104 are respectively brought into contact with annular stepped portions 101a and 101b of the housing 101, the rear surface of an inner race 112 of the pinion head bearing 103 is brought into contact with one end of the pinion gear 102a, the rear surface of a counter-bored inner race 122 of the pinion tail bearing 104 is brought into contact with an inner end surface of a companion flange 106, with the spacer 107 interposed between the front surface of the inner race 112 of the pinion head bearing 103 and the front surface of the counter-bored inner race 122 of the pinion tail bearing 104.

The lubricant oil, shown at level L, is accommodated in the housing 101 and is introduced into the pinion head bearing 103 and the pinion tail bearing 104 by substantially the lower halves of the bearings 103, 104 being submerged into the lubricant oil, as well as lubricant oil spattered upward as shown by the arrows in FIG. 1 by rotation of the ring gear 105. As the lubricant oil flows in this way, the lubricant oil passes through the interiors of the bearings 103 and 104. However, under high speed, the majority of the oil feeds through the pinion head bearing 103, which can result in higher drag, termed as churning losses, resulting in an undesirable increase in friction. Additionally, as the lubricant oil is distributed and/or based on certain operating states, such as when a vehicle is traveling downhill, the oil level L can drop below the level where the bottom portion of the pinion tail bearing 104 remains submerged, resulting in insufficient lubrication.

Due to the proximity of the pinion head bearing 103 to the pinion gear 104, the pinion head bearing 103 receives splash lubrication from the pinion gear interface with the ring gear 105. Therefore, the pinion head bearing 103 receives lubrication from both sides, exceeding the amount of lubrication provided to the pinion tail bearing 104 during most operating conditions and oil level conditions. In order to ensure adequate lubrication is delivered to the pinion tail bearing 104, the port through which splashed oil lubrication from the ring gear 105 must be arranged to capture and direct enough lubricant to ensure that the lifetime requirement of the pinion tail bearing 104 is met during the worst case lubrication conditions. The disadvantage of this strategy is that excessive lubrication is provided to the pinion head bearing 103 which yields higher bearing friction due to churning losses. It is necessary to provide adequate, but not excessive lubrication to both of the bearings for optimum efficiency of the differential assembly.

Other arrangements of pinion shaft and/or other shafts that are supported at opposite ends by bearings can also suffer from uneven lubricant oil flows due to various operating conditions.

It would be desirable to provide a simple, cost effective, and efficient way to regulate lubricant oil flow to ensure proper lubrication of such bearing arrangements in order to prevent premature bearing failure.

SUMMARY

Briefly stated, a shaft oil flow controller arrangement for pinion shaft bearings in a differential is provided. The arrangement includes a housing along with a pinion shaft supported in the housing by a head bearing and a tail bearing. A pinion gear is preferably provided on the pinion shaft. Each of the bearings includes an inner ring and an outer ring with rolling elements located therebetween. A ring gear is mounted for rotation in the housing and is engaged with the pinion gear. A bearing spacer is located on the pinion shaft that extends between the head bearing and the tail bearing. A diverter is located on the bearing spacer, and includes a circumferentially extending diverter wall that is moveable from a first position in which the diverter wall extends generally in a longitudinal direction of the pinion shaft at a first, lower rotational speed of the pinion shaft allowing a first volume of lubricant oil flow to the head bearing, to a second position, in which the diverter wall extends radially outwardly from the first position at a second, higher rotational speed, with a free end of the diverter wall being spaced radially further away from the bearing spacer than in the first position, to restrict lubricant oil flow to the head bearing to a second volume, lower than the first volume, and increase oil flow to the tail bearing relative to corresponding lubricant oil flow in the first position.

In one aspect, the diverter wall is formed from an elastomer. Alternatively, it is formed from a metallic material.

In another aspect, at the second, higher rotational speed, centrifugal forces acting on the diverter cause an elastic deformation of the diverter wall to the second position.

In one embodiment, the diverter wall is segmented. Alternatively, it can be continuous.

In one preferred arrangement, the diverter wall is formed in one piece with the bearing spacer. In other embodiments, the diverter wall is a separate part that is installed on the bearing spacer.

In one preferred arrangement, the diverter wall includes a reduced cross-sectional area at a location adjacent to the bearing spacer. This acts as a hinge area to allow flexing of the diverter wall radially outwardly due to centrifugal forces increasing at higher rotational speeds.

In a preferred arrangement, the head bearing and tail bearing are both tapered roller bearings.

In another aspect, a bearing spacer in accordance with the above for pinion shaft bearings is provided with a shaft oil flow controller. This provides the bearing spacer as a spacer sleeve, with the diverter as discussed above located on the spacer sleeve. This can be provided for assembly in a differential or in other arrangements where an axle or shaft is supported by head and tail bearings in order to control the lubricant oil flows to the bearings under different speed conditions.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
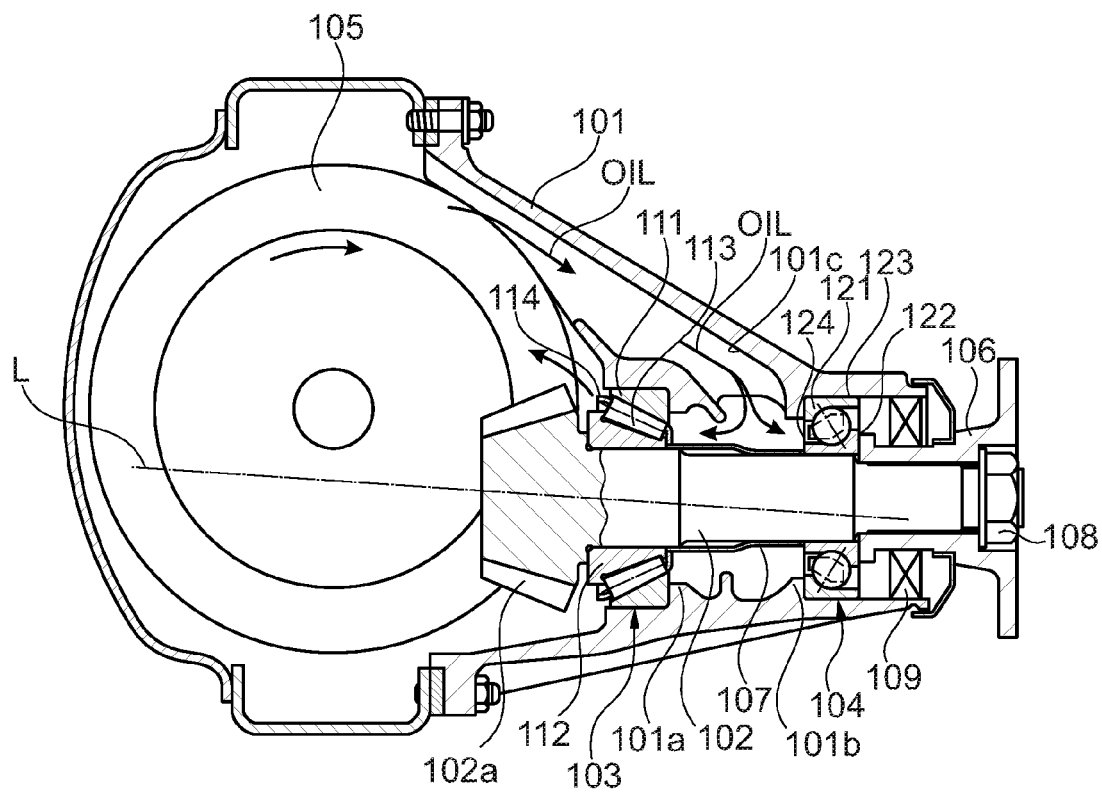
FIG. 1 is a cross-sectional view of a prior art differential.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft or rotating part. "Radially" refers to a direction perpendicular to an axis. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 2:
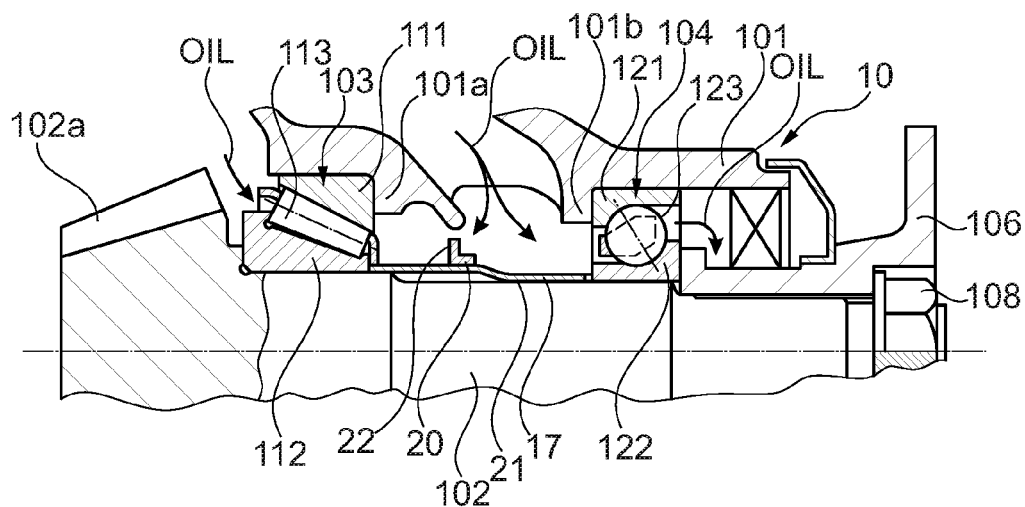
FIG. 2 is an enlarged cross-sectional view of a pinion shaft supported by head and tail bearings including a bearing spacer with a diverter in accordance with the present disclosure.

Referring to FIG. 2, a shaft oil flow controller arrangement for pinion shaft bearings in a differential assembly 10 in accordance with one embodiment is shown. The differential 10 generally corresponds to the differential in accordance with the prior art and includes the housing 101 along with the pinion shaft 102 having the pinion gear 102a located at the first end that engages with the ring gear 105. The pinion shaft 102 is supported in the housing 101 by a head bearing 103 and a tail bearing 104. Each of these bearings 103, 104 includes an inner ring 112, 122 and an outer ring 111, 121, with rolling elements 113, 123 located there between. Although the arrangement shows the head bearing 103 as a tapered roller bearing and the tail bearing 104 as an angular contact ball bearing, those skilled in the art will recognize that the types of bearings can be varied. The ring gear 105 is mounted in the known manner for rotation in the housing 101 and is driven via engagement with the pinion gear 102a. Arrows labeled "OIL" in the figures indicate the oil flow direction.

A bearing spacer 17 formed as a sleeve 21 is located on the pinion shaft 102 and extends between the head bearing 103 and the tail bearing 104. The bearing spacer 17 is used in order to preload the bearings 103, 104, and preferably contacts the inner rings 112, 122 of the bearings 103, 104 when a clamping force is applied by the nut 108. A diverter 20 is located on the bearing spacer 17, and includes a circumferentially extending diverter wall 22 that is moveable from a first position, shown in detail in FIG. 3 where the diverter wall is indicated as 22 and extends generally in a longitudinal direction of the pinion shaft 102 at a first, lower to rotational speed of the pinion shaft 102 to allow a first volume of lubricant oil flow to the head bearing 103, to a second position shown in detail in FIG. 5, in which the diverter wall, indicated as 22', extends radially outwardly from the first position at a second, higher rotational speed. Here a free end 24 of the diverter wall 22' is spaced radially further away from the bearing spacer 17 than in the first position, indicated by the diverter wall 22 in FIG. 3. This restricts the oil flow to the head bearing 103 to a second volume, lower than the first volume, due to the smaller space between the diverter 22' and the adjacent housing projection 41 and increases the oil flow to the tail bearing 104 relative to the corresponding oil flow in the first position. As shown in detail in FIG. 5, housing 101 is preferably provided with the projection 41 that is aligned with a free end of the diverter wall 22' in the second position. Both the radial extension of the diverter wall 22 and the size of the projection 41 can be adjusted in order to provide a desired spacing to control lubricant oil flow based on the rotational speed.

Figure 3:
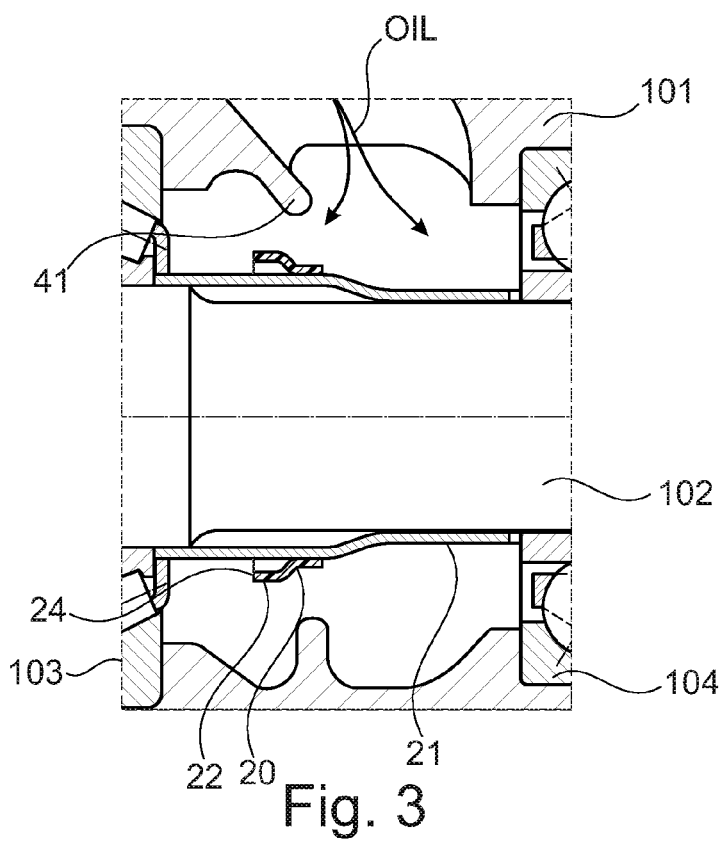
FIG. 3 is an enlarged cross-sectional view of the bearing spacer of FIG. 2 with the diverter wall in a first position.
Figure 4:
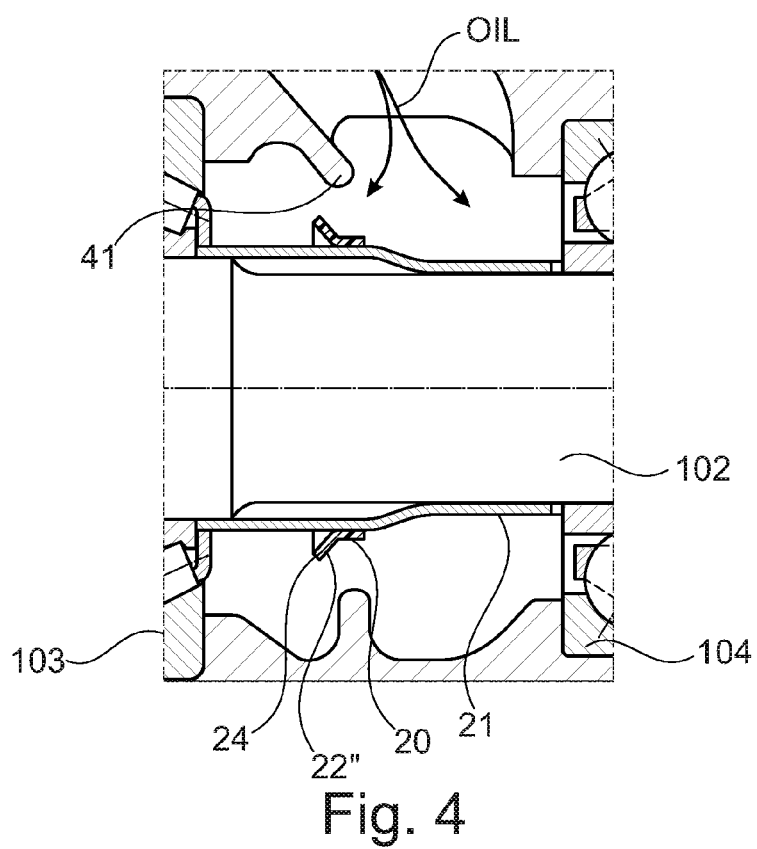
FIG. 4 is a cross-sectional view similar to FIG. 3, with the diverter wall shown in a third position.
Figure 5:
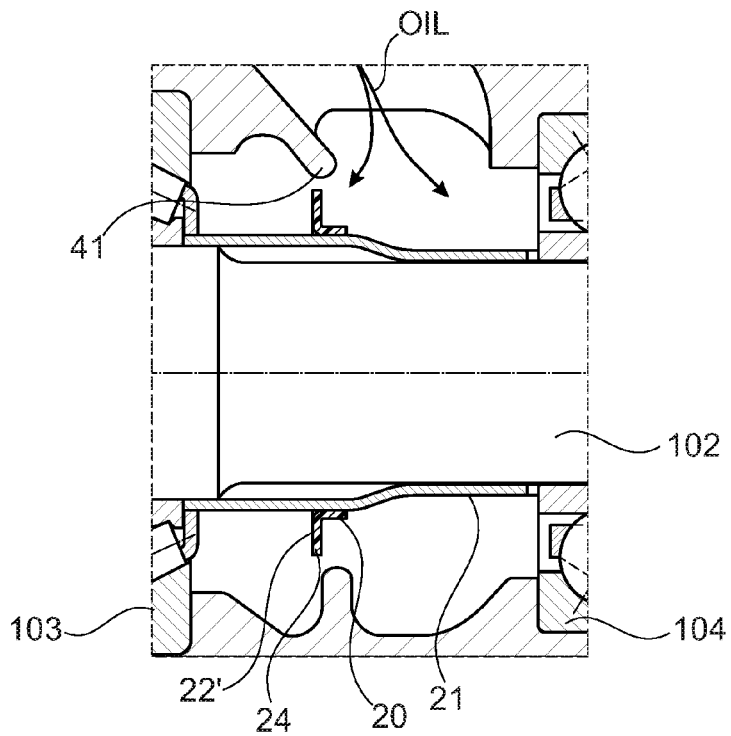
FIG. 5 is a cross-sectional view similar to FIGS. 3 and 4 showing the diverter wall in a second position.

The diverter wall 22 is preferably deflectable to various intermediate positions, indicated as 22" in FIG. 4 depending upon the rotational speed between the first, lower rotational speed which would result in the diverter wall being in the home position shown in FIG. 3, and the second, higher rotational speed as shown in FIG. 5 which shows the diverter 22 in a maximum deflected position. At low rotational speeds, a higher volume of lubricant oil flow can be fed to the head bearing 103. At high speeds, the lubricant oil flow is preferably diverted away from the head bearing 103, with the flow being further restricted as the speed increases as shown in FIGS. 3-5. This improves head bearing efficiency and reduces friction at high speed while ensuring that the tail bearing 104 receives a sufficient oil flow to prevent premature wear.

Figure 9:
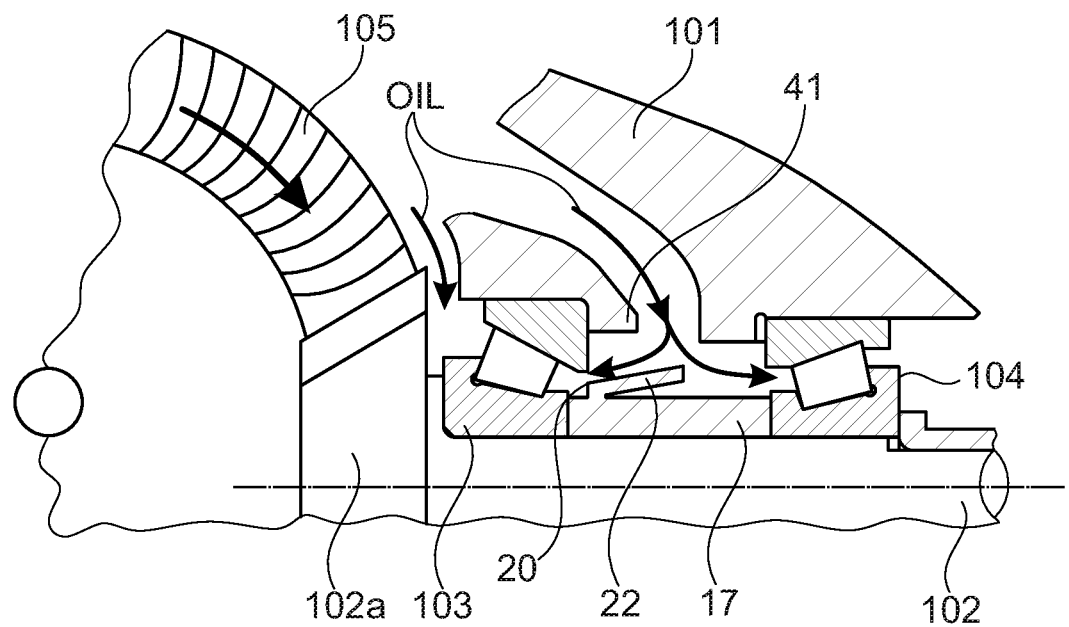
FIG. 9 is a partial cross-sectional view similar to FIG. 2 showing another embodiment of a bearing spacer with a diverter located between head and tail bearings which are both tapered roller bearings, with the diverter wall shown in the first position.
Figure 10:
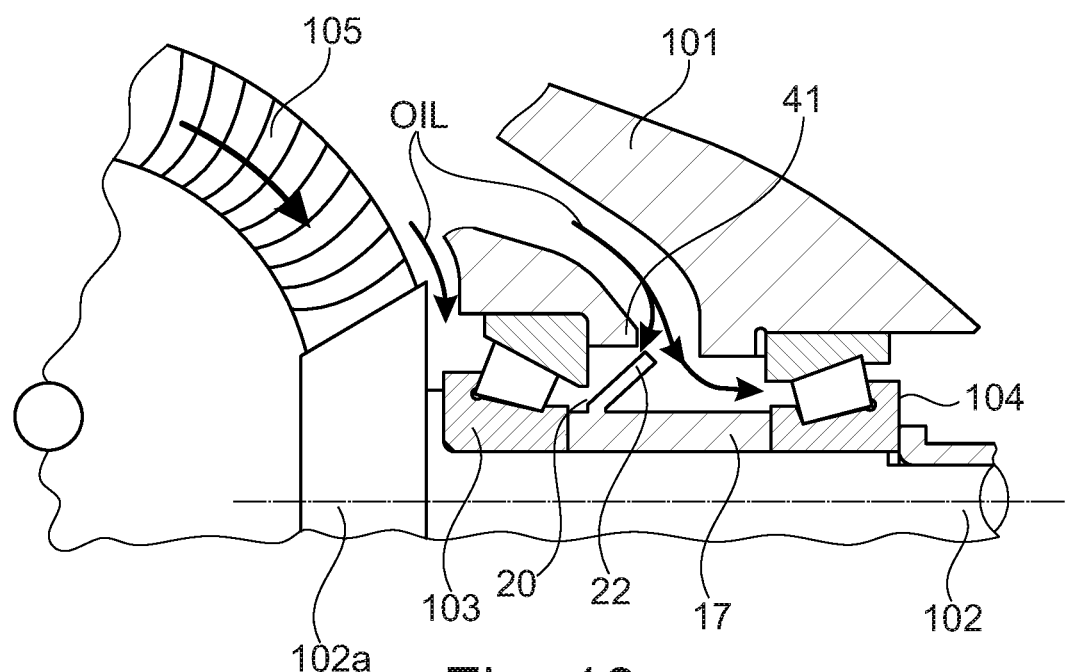
FIG. 10 is a partial cross-sectional view similar to FIG. 9 showing the diverter wall in the second position.

As shown in FIGS. 2-4, the diverter wall 22 can be formed of an elastomer and installed as a separate part on the sleeve 21. Alternatively, as shown in the arrangement in FIGS. 9 and 10, where the bearings 103, 104 are both indicated as tapered roller bearings, the diverter wall 22 may be formed integrally on the sleeve 21 to form the bearing spacer 17. The diverter wall 22 can also be formed of a metallic material.

Figure 6:
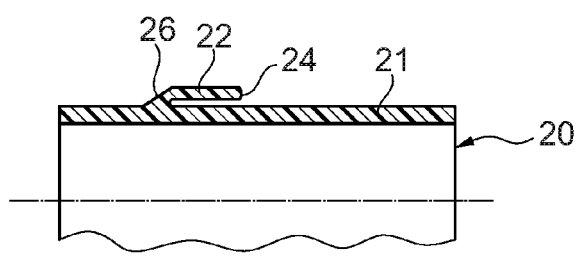
FIG. 6 is a partial cross-sectional view showing a bearing spacer with a diverter wall.
Figure 7:
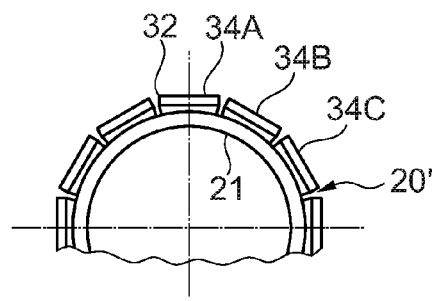
FIG. 7 is an end view showing one preferred arrangement of a segmented diverter wall.

At the second higher rotational speed, which can be, for example, in the range of 1000-3500 RPM, centrifugal forces acting on the diverter 20 cause an elastic deformation of the diverter wall 22 to the second position indicated as 22' in FIG. 5. The material properties and configuration of the diverter wall 22 can be tuned for a specific speed profile and/or application. This can be facilitated by forming the diverter wall 22 with a weighted free end 24 based on an increased material thickness. It is also possible to provide the diverter wall 22 with a reduced cross-sectional area 26 at a location adjacent to the bearing spacer 17 shown in the detail of one embodiment of the diverter 20 formed integrally with the spacer sleeve 21 in FIG. 6. As shown in FIG. 7, it is also possible to provide the diverter wall 32 as a segmented wall having segments 34a, 34b, 34c, etc. This can be used in combination with the heavier free end and/or the reduced cross-sectional area at the location adjacent to the bearing spacer 17 to provide the desired deflection properties.

Figure 8:
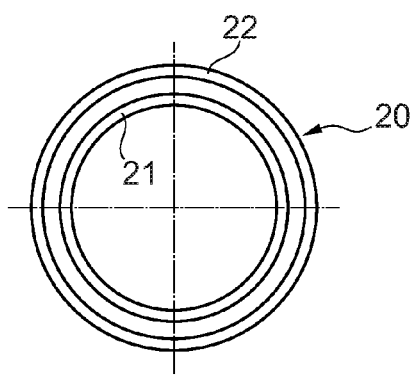
FIG. 8 is an end view showing a second configuration of a continuous diverter wall.

FIG. 8 shows an end view of the integrally formed spacer sleeve 21 and diverter wall 22 according to another embodiment.

When a separate diverter 20 is installed on a bearing spacer 17, it can be attached via an interference fit, bonding, or welding, depending upon the material of both the bearing spacer 17 and the diverter 20. For an integrally formed bearing spacer 17 including a spacer sleeve 21 with the diverter 22 located on and formed integrally with the spacer sleeve 21, this can be a molded part or a machined metal part.

The bearing spacer 17 with the diverter 20 can be provided as a separate part or as part of the overall shaft oil flow controller arrangement.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A shaft oil flow controller arrangement for pinion shaft bearings in a differential, comprising:
    a housing;
    a pinion shaft with a pinion gear supported in the housing by a head bearing and a tail bearing, each of the bearings including an inner ring and an outer ring with rolling elements located there between;
    a ring gear mounted for rotation in the housing and engaged with the pinion gear;
    a bearing spacer located on the pinion shaft and extending between the head bearing and the tail bearing; and
    a diverter located on the bearing spacer, including a circumferentially extending diverter wall movable from a first position, in which the diverter wall extends generally in a longitudinal direction of the pinion shaft at a first, lower rotational speed of the pinion shaft allowing a first volume of lubricant oil flow to the head bearing, to a second position, in which the diverter wall extends radially outwardly from the first position at a second, higher rotational speed, with a free end of the diverter wall being spaced radially further away from the bearing spacer than in the first position, to restrict lubricant oil flow to the head bearing to a second volume, lower than the first volume, and increase oil flow to the tail bearing relative to corresponding lubricant oil flow in the first position.

2. The shaft oil flow controller arrangement of claim 1, wherein the diverter wall is formed of an elastomer.

3. The shaft oil flow controller arrangement of claim 1, wherein the diverter wall is formed of a metallic material.

4. The shaft oil flow controller arrangement of claim 1, wherein at the second, higher rotational speed, centrifugal forces act on the diverter causing an elastic deformation of the diverter wall to the second position.

5. The shaft oil flow controller arrangement of claim 1, wherein the diverter wall is segmented.

6. The shaft oil flow controller arrangement of claim 1, wherein the diverter wall is formed in one piece with the bearing spacer.

7. The shaft oil flow controller arrangement of claim 1, wherein the diverter wall is a separate part that is installed on the bearing spacer.

8. The shaft oil flow controller arrangement of claim 1, wherein the diverter wall includes a reduced cross-sectional area at a location adjacent to the bearing spacer.

9. The shaft oil flow controller arrangement of claim 1, wherein the housing includes a projection located opposite to the free end of the diverter wall in the second position.

10. The shaft oil flow controller arrangement of claim 1, wherein the head bearing and the tail bearing are tapered roller bearings.

11. A bearing spacer for shaft bearings including a shaft oil flow controller, comprising
    a spacer sleeve; and
    a diverter located on the spacer sleeve, including a circumferentially extending diverter wall movable from a first position, in which the diverter wall extends generally in a longitudinal direction of the spacer sleeve at a first, lower rotational speed, to allow a first volume of lubricant oil flow to a head bearing, to a second position, in which the diverter wall extends radially outwardly from the first position at a second, higher rotational speed, with a free end of the diverter wall being spaced radially further away from the spacer sleeve than in the first position, to restrict lubricant oil flow to the head bearing to a second volume, lower than the first volume, and increase oil flow to a tail bearing relative to corresponding lubricant oil flow in the first position.

12. The bearing spacer of claim 11, wherein the diverter wall is formed of an elastomer.

13. The bearing spacer of claim 11, wherein the diverter wall is formed of a metallic material.

14. The bearing spacer of claim 11, wherein at the second, higher rotational speed, centrifugal forces act on the diverter causing an elastic deformation of the diverter wall to the second position.

15. The bearing spacer of claim 11, wherein the diverter wall is segmented.

16. The bearing spacer of claim 11, wherein the diverter wall is formed in one piece with the bearing spacer.

17. The bearing spacer of claim 11, wherein the diverter wall is a separate part that is installed on bearing spacer.

18. The bearing spacer of claim 11, wherein the diverter wall includes a reduced cross-sectional area at a location adjacent to the bearing spacer.

* * * * *